Patented Feb. 26, 1952

2,586,793

UNITED STATES PATENT OFFICE 2,586,793

METHOD OF PREVENTING INFECTION BY COCCIDIA BY EMPLOYING A BROMO-ALKENE

Alfred E. Doty, Saginaw, Julius E. Johnson, Jr., Midland, Dorsey R. Mussell, Clare, and Mark A. Wolf, Midland, Mich., assignors to The Dow Chemical Company, Midland, Mich., a corporation of Delaware No Drawing. Application March 14, 1947, Serial No. 734,874

5 Claims. (Cl. 167—22)

This invention relates to the control of parasitic organisms and is particularly concerned with a method for preventing the infection of domestic animals and poultry by parasitic organisms.

Poultry and domestic animals are subject to attack by a wide variety of animal and bacterial organisms. Internal parasites alone cause millions of dollars in losses annually. Much of this difficulty from infections, both internal and external, is directly attributable to contact by the animal or bird with infected soil, litter, and pen or housing surfaces, or excreta, or ingestion of food contaminated thereby. The minimizing of such infections by controlling the responsible organisms present in possible sources of contamination would greatly reduce present day losses. Also, the prevention of initial infection is much to be preferred over the later medication of animals in diseased condition which could and should have been avoided. The desirability and need for the development of new and improved techniques and methods for reducing animal and poultry losses from parasitic organisms is evident.

It is an object of the present invention to provide a method for the prevention of infection by parasitic organisms of domestic animals and poultry. It is a further object to supply a method which will accomplish such desirable result by controlling the organisms, their eggs, spores and other intermediate life forms before the latter accomplish the infection of the animal or bird. An additional object is to provide a method for preventing infection of domestic animals and poultry which method will provide for the disinfection of possible sources of contamination normally associated with such animals and poultry. Other objects of the invention will become apparent from the following specification and claims.

According to the present invention, it has been discovered that poultry and domestic animals are protected against infection by parasitic organisms when the soil, litter, pens, and housing with which they are normally associated are treated with a synthetic bromo-alkene of high vapor pressure and having the formula

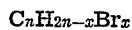

$$C_nH_{2n-x}Br_x$$

wherein $n$ is an integer from 3 to 4, inclusive, and $x$ is an integer from 1 to 2, inclusive. The compounds of the foregoing formula have been found to be very toxic against protozoal, fungal, bacterial, and related organisms, and their intermediate life stages, and to exert a lethal action much more rapidly and at lower toxicant concentrations than most other synthetic organic compounds of related chemical structure.

The bromo-alkene compounds employed in the method of the present invention, all are either liquids or low melting solids. For example, allyl bromide is a liquid boiling at 70°–71° C. 1.3-dibromo-propene is a liquid boiling at 155°–156° C. 1.4-dibromo-butene-2 is a solid melting at 53° C. Each of the compounds has both a high vapor pressure and high vapor density whereby their vapors tend to penetrate into cracks and crevices, and through soil and litter to accomplish a more thorough control of organisms than could be accomplished with lighter and more volatile fumigant materials. The compounds are characterized by pungent and penetrating odors, and are somewhat toxic to warm-blooded animals. It is desirable that any enclosure in which the compounds have been employed be well aired before being re-utilized as an animal or poultry pen or coop. Reasonable care should be exercised in handling the compounds as they are irritating to the skin and mucous membranes of humans. The compounds do not leave residues toxic to domestic animals and poultry, but vaporize completely and cleanly within a reasonable time.

A wide range of organisms have been found to be controlled by operating in accordance with the method of the present invention. Representative of the parasites affected are protozoal organisms, such as coccidia; pathogenic bacteria, such as *Salmonella pullorum*, *Eberthella typhosa*, and *Staphylococcus aureus;* nema and annelids, such as cecal worms; trematodes, such as liver flukes; cestodes such as *Taenia cesticillus;* etc. The method is also effective for the control of certain diseases by destruction of the soil borne vector of the disease. For example, the disinfection of premises to control cecal worm eggs would be effective in the control of blackhead in turkeys. Here, the causative organism is *Histomonas meleagridis* which is harbored in the cecal worm egg.

It is to be emphasized that the present invention is not concerned with any operation wherein the effective agent is to be ingested by the animal. The control of the organisms, as listed above, is accomplished by treatment of the soil, litter, housing, and other surfaces normally contacted by the animal or fowl, and in many instances operates by control of the eggs, spores, or other intermediate life stage of the organisms.

The invention is adapted to be employed in connection with the raising of any poultry or domestic animal. It is particularly applicable as regards chickens, turkeys, ducks, geese, mice, rabbits, dogs, cats, sheep, cattle, and the like. A further application is in connection with the rearing in confined quarters of wild life such as pheasants, quail, grouse, fox, mink, etc.

When operating in accordance with the present invention, the bromo-alkene may be applied in any suitable fashion. In one embodiment, the control of the parasitic organisms is accompanied by space fumigation. In such operation, the toxicant may simply be introduced into the house, pen, coop, chamber or other building to be disinfected and permitted to vaporize slowly over a considerable period of time. In a further modification, the bromo-alkene may be heated or otherwise manipulated to cause a quick vaporization.

Another mode of operation consists of employing the bromo-alkene as a constituent of a liquid composition. Such composition may be applied by spraying or sprinkling. When proceeding in this fashion, the toxicant may be dissolved or dispersed in an organic solvent to produce a spray mixture of any desired concentration. Such solution or the bromo-alkene itself may be dispersed in water to produce emulsion-type compositions adapted to be applied to the soil, litter, or other surfaces to be contacted by the animal or bird.

A further manner in which the toxicant may be applied is by injection of the toxicant, where liquid, or of a suitable solution or dispersion of the toxicant below the surface of the soil, litter, or bedding, and at spaced intervals so as to accomplish the building up of a lethal concentration of the toxicant in the zone of infection.

The toxicant may also be compounded to produce an aerosol, using a suitable propellent, such as Freon, methyl chloride, or methyl bromide. An optional constituent of the mixture in the aerosol is a liquid carrier or blending agent. "Freon" is a chloro-fluoro-methane.

A further and preferred mode of operation is to disperse the bromo-alkene in and on a finely-divided carrier to produce a dust mixture. Such product may be sprinkled or dusted upon infected surfaces or may be worked into soil, litter, and the like to accomplish the desired control of parasitic organisms and their intermediate life stages.

In connection with the treatment of soil, litter, bedding, and the like, it is to be understood that such infected surfaces and areas subsequent to treatment may be blanketed with tarpaulins or other vapor-confining coverings, so as to ensure the prolonged contact of the chemical and its vapors with the organisms to be controlled. A modification of this procedure comprises sprinkling or spraying the surface of soil, litter, and the like with water immediately following treatment with the toxicant to accomplish the sealing of the surface, whereby the toxicant is maintained within the treated material for an extended period of time.

The exact proportions of toxicant required to control different organisms vary considerably. In the operation of the invention, any lethal concentration of the bromo-alkene may be employed, the exact proportion being dependent upon the organisms to be controlled and the conditions under which control is to be accomplished. In connection with the treatment of soil, litter, and the like, it has been found that about 0.5 gram per square foot gives an adequate control. However, with certain compounds and organisms, much lower concentrations are effective. For example, in the control of coccidia 1.3-dibromo-propene is effective at 0.3 gram per square foot, and 1.4-dibromo-butene-2 at 0.25 gram per square foot. In space fumigation operations, good control of coccidial infection in chickens has been obtained when the pens, houses, and premises have been fumigated with as little as 0.125 pound of 1.3-dibromo-propene per 1000 cubic feet. In practice it is suggested that at least 0.2 pound of toxicant per 1000 cubic feet be employed.

The proportions of toxicant employed in the various spray and dust compositions are not critical. Thus a spray may contain from a fraction of 1 percent of bromo-alkene to as much as 40 or 50 percent by weight of the toxicant. Here again, the exact manner of application is largely controlling. In injection operations for the treatment of soil and litter, liquid compositions containing from about 5 to about 20 percent of the toxicant have been found satisfactory.

Dust compositions may vary in concentration from about 0.5 percent to as high as 20 percent or higher by weight of toxicant. Among the controlling factors here are the manner in which the composition is to be sprinkled or dusted or worked into the soil or litter and possible objections to the presence in and on the treated surfaces of excesses of finely-divided dust carrier.

Any suitable solvent or other liquid may be employed as carrier for the toxicants in accordance with the method herein described. Thus, the bromo-alkenes may be emulsified or otherwise dispersed in water. Similarly, such solvents as carbon tetrachloride, chloroform, ethylene dichloride, propylene dichloride, chloro-benzene, xylene, ethanol, or various fractions of petroleum distillates, may be employed. As previously indicated, such solvent solutions of toxicant may be emulsified with water, if desired. Wetting, emulsifying, and dispersing agents which may be incorporated into the simple solutions or dispersions to accomplish the preparation of such compositions, include soaps, salts of sulphonated alcohols, polyglycols, ether-ester complexes, glyceryl esters, the metal naphthenates, sulphonated hydrocarbons and their salts, etc.

Finely-divided solids which are adapted to be employed as carriers for the bromo-alkenes include pyrophyllite, clays, absorptive clay, diatomaceous earth, talc, finely-divided carbon, wood flour, sawdust, volcanic ash, etc.

The following examples illustrate the invention, but are not to be construed as limiting.

EXAMPLE 1

A series of determinations were carried out with various spray and dust compositions containing the bromoalkenes, in which the compositions were applied to the surface of soil and/or litter in small brooder houses. In this operation, soil or litter consisting of shredded cane, straw, etc., was distributed over the floor of the brooder houses to a depth of 3 or 4 inches and thereafter moistened and heavily infected with a suspension of sporulated oöcysts of *Eimeria tenella*. These oöcysts constitute an infectious stage of the coccidia. The fumigant compositions, where liquid, were then sprayed upon the surface of the soil or litter. Where dusts were employed, the composition was distributed more or less evenly over the surface of the soil or litter and thereafter worked lightly into the surface thereof. Twenty-four to forty-eight hours after treatment, the houses were aired and a number of 10 to 12 day old chickens confined therein. Feed was spread on the soil or litter during the first 24 hours of the chickens' confinement, and thereafter standard feeding and watering units were made available.

After exposure to the contaminated soil or litter, observations were made to determine whether or not coccidiosis developed in the chickens. This disease runs a typical course. Five days after infection, the droppings are bloody, due to hemorrhage of the damaged cecal mucosa, so that visual observations were indicative of the degree of infection. In each instance, however, the birds were killed and autopsied seven days after having been confined in the brooders, and microscopic examination was made of the cecal contents of each bird to determine the degree of cecal damage and the presence or absence of oöcysts in the cecal contents. Both the visual observations of droppings and the examination of the ceca and cecal contents were relied upon in determining the degree of coccidial infection.

The following table sets forth the results obtained with representative compositions.

grams of 1.4-dibromo-butene-2 and 244 grams of ethylene dichloride were charged into an aerosol bomb. This mixture was then liberated as an aerosol in a 500 cubic foot brooder house contaminated with *Salmonella pullorum* and sporulating oöcysts of coccidia as described in Example 1. Twenty-four hours after this treatment, the brooder house was thoroughly aired, and 12 day old chicks introduced therein substantially as described in Example 1. Seven days later, the usual observations were made to determine the degree of infection of the chicks. No coccidial infection was found. Also, a complete control of *Salmonella pullorum* was obtained.

EXAMPLE 4

1.3-dibromo-propene was employed as a space fumigant in the treatment of enclosures containing soil contaminated with the oöcysts of coccidia and at the rate of 0.125, 0.5, and 1.0 pounds per 1000 cubic feet. Sixteen hours after treatment, chicks were exposed to the infective organisms and observed for the development of coccidosis. At all rates of treatment, a complete control was obtained as regards prevention of coccidial infection in the chicks. Chicks employed in control determinations were badly infected.

*Table*

| Compound | Composition | Compound Applied Gms./Sq. Ft. | Presence of Bloody Droppings | Autopsy | | |
|---|---|---|---|---|---|---|
| | | | | Degree Cecal Damage | Oöcysts in Cecal Contents | Degree of Coccidial Infection |
| Allyl Bromide (On Litter) | 5% (Wt./Vol.)[1] | 1.0 | None | Trace | Very Few | Trace. |
| 1.3-Dibromo-Propene (On Soil) | 10% (Wt./Vol.)[2] | 0.3 | do | | Few | Do. |
| Do | 10% (Wt./Vol.)[2] | 0.6 | do | | None | None. |
| Do | 10% (Wt./Vol.)[2] | 1.2 | do | | do | Do. |
| 1.4-Dibromo-Butene-2 (On Litter) | 1.25% [3] | 0.25 | do | | Few | Trace. |
| Do | 2.5% [3] | 0.50 | do | | None | None. |
| Do | 5.0% [3] | 1.0 | do | | do | Do. |
| Control (On Litter) | | | Positive | | Abundant | Severe. |
| 1.4-Dibromo-Butene-2 (On Soil) | 5% [3] | 1.0 | None | | None | None. |
| Control (On Soil) | | | Positive | | Abundant | Severe. |
| 1.4-Dibromo-Butene-2 (On Soil) | 10% [4] | 1.0 | None | None | None | None. |
| Control (On Soil) | | | Positive | Severe | Abundant | Severe. |
| 1.4-Dibromo-Butene-2 (On Litter) | 10% [5] | 1.0 | None | None | None | None. |
| Do | 10% [6] | 1.0 | do | do | do | Do. |
| Do | 10% [7] | 1.0 | do | do | do | Do. |

[1] In ethylene dichloride.
[2] In Stoddard solvent.
[3] In Stoddard solvent-ethylene dichloride mixture.
[4] In and on pyrophyllite.
[5] In and on adsorptive clay.
[6] In and on diatomaceous earth.
[7] In xylene.

EXAMPLE 2

Further determinations were run in connection with the disinfecting of brooder houses. In these operations, 1.4-dibromo-butene-2 was employed as a spray. The brooder house was of dirt floor construction and the contaminating organism was *Salmonella pullorum.*

A composition was prepared in which the constituents were combined in the proportions of 1 gram of 1.4-dibromo-butene-2 dissolved in 2.4 grams of ethylene dichloride and approximately 16 milliliters of a light petroleum distillate marketed as Stoddard solvent. This composition was applied by spraying in an amount equal to 1 gram of the 1.4-dibromo-butene-2 per square foot of soil surface. In these operations the *Salmonella pullorum* was effectively controlled and it was impossible to obtain living cultures from the previously contaminated surfaces.

EXAMPLE 3

In an operation similar to that described in Example 2, 454 grams of methyl bromide, 100

EXAMPLE 5

In a further determination, 1.3-dibromo-propene was employed in the treatment of soil infected with coccidia. This operation was carried out by injecting the 1.3-dibromo-propene into the contaminated soil to a depth of approximately 3 inches and on 6 inch centers and thereafter dampening the surface of the soil with water to provide a water seal. The 1.3-dibromo-propene was applied without diluent and in the amounts of 0.3, 0.6 and 1.2 grams per square foot of soil under treatment. Two days following the treatment 2 week old chickens were exposed to contamination from the treated soil. Autopsy of these chickens after a 7 day interval, showed complete prevention of coccidiosis in the operations employing 0.6 and 1.2 grams of 1.3-dibromo-propene per square foot, and only a trace of infection in the operation employing 0.3 gram per square foot. Birds employed in control determinations were heavily infected.

What is claimed is:

1. A method for preventing the infection of domestic animals and poultry by coccidia which includes the steps of treating the soil, litter, pens, and housing associated with such animals and poultry with a synthetic bromo-alkene of high vapor pressure and having the formula, $$C_nH_{2n-x}Br_x$$

wherein $n$ is an integer from 3 to 4, inclusive, and $x$ is an integer from 1 to 2, inclusive, in an amount sufficient to provide a concentration of at least 0.5 gram of the bromo-alkene per square foot of area treated, and thoroughly airing the treated surfaces.

2. A method for preventing the infection of domestic animals and poultry by coccidia which includes the step of treating the soil, litter, pens, and housing associated with such animals and poultry with 1.4-dibromo-butene-2, in sufficient concentration to exert a lethal action upon the infectious organisms and their intermediate life stages.

3. A method for preventing the infection of domestic animals and poultry by coccidia which includes the step of treating the soil, litter, pens, and housing associated with such animals and poultry with 1.3-dibromo-propene, in sufficient concentration to exert a lethal action upon the infectious organisms and their intermediate life stages.

4. A method for preventing the infection of domestic animals and poultry by coccidia which includes the step of treating the soil, litter, pens, and housing associated with such animals and poultry with allyl bromide, in sufficient concentration to exert a lethal action upon the infectious organisms and their intermediate life stages.

5. A method for preventing the infection of domestic animals and poultry by coccidia which includes the step of fumigating the soil, litter, pens, and housing associated with such animals and poultry with a synthetic bromo-alkene of high vapor pressure and having the formula, $$C_nH_{2n-x}Br_x$$

wherein $n$ is an integer from 3 to 4, inclusive, and $x$ is an integer from 1 to 2, inclusive, in the amount of at least 0.2 pound of toxicant per 1,000 cubic feet of space under treatment.

ALFRED E. DOTY.
JULIUS E. JOHNSON, JR.
DORSEY R. MUSSELL.
MARK A. WOLF.

REFERENCES CITED

The following references are of record in the file of this patent:

UNITED STATES PATENTS

| Number | Name | Date |
|---|---|---|
| 2,057,044 | Meisenburg et al. | Oct. 13, 1936 |
| 2,139,102 | Steik et al. | Dec. 6, 1938 |
| 2,281,239 | Hass | Apr. 28, 1942 |
| 2,316,963 | McKee et al. | Apr. 20, 1943 |
| 2,403,435 | Hammer | July 9, 1946 |
| 2,415,251 | Leavitt | Feb. 4, 1947 |
| 2,424,520 | Tonkin | July 22, 1947 |

OTHER REFERENCES

Lehman, "Organic Fumigants for Wireworms," Jour. Econ. Entom. 35, No. 5 (Oct. 1942), 659–661. (Copy in Div. 43.)

Roark & Cotton, U. S. Dept. of Agriculture Tech. Bull. No. 162, March 1929, Tests of Various Aliphatic Compounds as Fumigants, pp. 1, 7, 35, 44. (Copy in 167–22.)